(12) United States Patent
Kilkki

(10) Patent No.: US 6,249,816 B1
(45) Date of Patent: Jun. 19, 2001

(54) NBR POOL FOR SIMA NETWORK

(75) Inventor: Kalevi Kilkki, Espoo (FI)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/120,607

(22) Filed: Jul. 22, 1998

(51) Int. Cl.[7] .................................................. G06F 13/00
(52) U.S. Cl. ........................ 709/223; 709/226; 709/227
(58) Field of Search ................................... 709/223, 224, 709/225, 226, 227; 705/30, 34

(56) References Cited

U.S. PATENT DOCUMENTS

| | | |
|---|---|---|
| 5,099,235 | 3/1992 | Crookshanks . |
| 5,295,139 * | 3/1994 | Palmer ................................. 370/255 |
| 5,757,784 * | 5/1998 | Liebowitz et al. ................... 370/321 |
| 5,960,416 * | 9/1999 | Block ..................................... 705/34 |
| 6,031,845 * | 2/2000 | Walding ............................... 370/468 |
| 6,035,281 * | 3/2000 | Crosskey et al. ...................... 705/14 |

FOREIGN PATENT DOCUMENTS

| | | |
|---|---|---|
| 44 41 356 A1 | 1/1995 | (DE) . |
| 753 979 | 1/1997 | (EP) . |

OTHER PUBLICATIONS

"Charging and Billing Issues in High Speed Heterogeneous Networking Environments", Raffali–Schreinemachers et al., *Global Information Infrastructure (GN) Evolution*, Jan. 10, 1996, pp. 97–108.

"Tariffs and effective bandwidths in multiservice networks", Kelly, *Teletraffic Science and Engineering*, vol. 1A, Jun. 6, 1994, pp. 401–410.

"Quality of Service Guarantees and Charging in Multiservice Networks", *IEICE Trans. Commun.*, vol. E81–B, No. 5, May 1998, pp. 824–831.

Translation of abstract for German Patent No. DE 44 41 356 A1.

"Joint Source/Channel Coding of Statistically Multiplexed Real–Time Services On Packet Networks"; Garrett et al.; *ACM transactions on Networks, U.S.*; IEEE Inc., New York, vol. 1, No. 1, 1993; pp. 71–80.

"Decentralized network connection preemption algorithms"; Peyravian & Kshemkalyani; *Computer Networks and ISDN Systems*; 1998; pp. 1029–1043.

"Integrated Services in the Internet Architecture: an Overview"; Braden et al.; *Network Working Group*; http://ww.ietf.org/rfc/rfc1633.txt; Jun. 1994; pp. 1–31.

"Internet Protocol, Version 6 (IPv6) Specification"; Deering and Hinden, *Network Working Group*; http://afs.wu–wien.ac.at/manuals/rfc/rfc1883.txt; Dec. 1995, pp. 1–35.

"Simple Integrated Media Access (SIMA)"; K. Kilkki; *Network Working Group Internet–Draft*; http://www–nrc.nokia.com/sima>; Jun. 1997; pp. 1–21.

"Meeting the challenges of deploying the global broadband network infrastructure"; *1998 IEEE ATM Workshop Proceedings*; May 26–29, 1998; pp. 225–233.

* cited by examiner

*Primary Examiner*—Viet D. Vu
(74) *Attorney, Agent, or Firm*—Altera Law Group LLC

(57) ABSTRACT

A method and system is used in a communication network for charging a flat- rate for a customer's Nominal Bit Rate ($NBR_p$) of the network as well as providing a variable actual Nominal Bit Rate ($NBR_r$) suitable for momentarily desired high nominal bit rates requested by the customer. In one embodiment, the network provides a maximum pool size ($S_{max}$) which is predefined between a network operator and the customer. In another embodiment, instead of having the maximum pool size, the network provides the variable $NBR_r$ by filling the NBR pool progressively as a function of $NBR_p$, a customer's desired Nominal Bit Rate ($NBR_d$), and a constant z, for a period of time. A momentarily much higher $NBR_r$ can be provided based on the capacity of the filled NBR pool.

22 Claims, 2 Drawing Sheets

NBR POOL FOR SIMA NETWORK

RELATED PATENT APPLICATION

The present invention relates to U.S. patent application entitled "USE ALLOWED PRIORITY LEVEL FOR ROUTING DECISION IN SIMA NETWORKS", Ser. No. 09/146,862 filed Sep. 3, 1998; U.S. patent application entitled "USE OF PRIORITIES DEFINED BY A CUSTOMER IN A SIMA NETWORK", Ser. No. 09/159,005 filed Sep. 23, 1998; U.S. patent application entitled "NOMINAL BIT RATE NETWORK SERVICE", Ser. No. 08/821,273, filed Mar. 20, 1997; U.S. patent application entitled "CELL SCHEDULING SYSTEM AND METHOD FOR NETWORK NODES", Ser. No. 08/822,266, filed Mar. 20, 1997, now U.S. Pat. No. 6,081,505; and U.S. patent application entitled "ACCOUNTING SYSTEM AND METHOD FOR A NOMINAL BIT RATE NETWORK SERVICE", Ser. No. 08/822,270, filed Mar. 20, 1997, now U.S. Pat. No. 6,047,326; the subject matter of which are hereby incorporated by reference.

BACKGROUND OF THE INVENTION

1. Field of the Invention

This invention relates in general to communication systems, and more particularly, to a method and system for managing information communicated over a Simple Integrated Media Access (SIMA) network with a Nominal Bit Rate (NBR) pool.

2. Description of Related Art

Simple Integrated Media Access (SIMA) is a new way of introducing new properties for packet-based data networks, such as TCP/IP or ATM networks. The basic idea of SIMA relies on the use of eight packet-discarding priority levels, as described in details in the above-mentioned patent applications, entitled "NOMINAL BIT RATE NETWORK SERVICE", NC 7664, Ser. No. 08/821,273, filed Mar.20, 1997; U.S. patent application entitled "CELL SCHEDULING SYSTEM AND METHOD FOR NETWORK NODES", NC 7665, Ser. No. 08/822,266, filed Mar. 20, 1997; and U.S. patent application entitled "ACCOUNTING SYSTEM AND METHOD FOR A NOMINAL BIT RATE NETWORK SERVICE", NC 7701, Ser. No. 08/822,270, filed Mar. 20, 1997; the subject matter of which are hereby incorporated by reference. Every data packet is equipped with a priority level (PL) that can be an integer between 0 and 7. In the latest SIMA literature, the term "priority level" is often replaced by "drop preference" which has the same meaning as "priority level".

In a SIMA network, priority is used for selecting packets that are discarded during congestion of a network node. The priority is determined from the ratio of a momentary actual bit rate of the source (a customer) to the Nominal Bit Rate (NBR) assigned to the source (the customer). This determination is performed in a network access node that is the first network element to receive a packet from a customer equipment.

A conventional way of managing customer charging on Internet is based on flat- rate, that is, each customer pays a monthly fee and gets certain Internet service. Since the management of a more complicated charging scheme for every individual customer means excessive management and cost, the flat-rate charging scheme is currently a prevalent way.

SIMA network with this type of simple flat-rate charging scheme is presently available for the customer. The monthly fee, for example $X, is translated to a certain NBR. The available network capacity is then divided among competing connections proportional to the NBR of each connection or customer. With typical data applications and low bit rate real-time applications, this SIMA network system may work properly. However, if a SIMA customer has, for instance, a permanent or flat-rate NBR of 50 kbit/s, and he/she desires to send a video stream with a speed of 500 kbit/s (i.e. higher NBR), the outcome could be totally unsatisfactory in using the simple flat-rate charging scheme. The priority of the packets (or called frames or cells) of information will be so low that the packet loss ratio will be very high. Consequently, the video quality will be very low for any practical purpose. This problem can be solved by combining the flat rate scheme and a time-dependent charging scheme presented in the above-mentioned U.S. patent applications. Although this solution is technically quite simple, it requires many changes in customer's management and charging. For example, the customer has to keep track of what period of time that he/she has requested for what NBR, other than the permanent NBR, and how much it is for such NBR, etc.

Accordingly, there is a need in the communication industry for a network management architecture and method that can combine the simplicity of flat-rate charging and the flexibility of time-dependent scheme into a SIMA network system.

SUMMARY OF THE INVENTION

The present invention relates to communication systems, and more particularly, to a method and system for managing information communicated over a SIMA network with a Nominal Bit Rate (NBR) pool.

To overcome the limitations in the prior art described above, and to overcome other limitations that will become apparent upon reading and understanding the present specification, the present invention discloses a NBR pool that is used with SIMA network so that a customer of a network service provider is allowed to change his/her NBR without any actual time-dependent charging. The NBR pool method and apparatus of the present invention has both the simplicity of flat-rate charging and the flexibility of time-dependent scheme. The advantage of this system is that a "pure" flat-rate charging is possible even though the customer is allowed to change the NBR.

In one embodiment of the present invention, a NBR pool is established such that each SIMA customer has a permanent NBR based on the monthly fee (flat or fixed fee) or some other fee schedules, such as semi-monthly, weekly, or annual fees, etc. In addition, the customer is allowed to momentarily use a higher NBR, but only during a limited time period and for a limited amount.

Further in one embodiment of the present invention, the NBR pool unit controls an actual NBR used for determining the SIMA priorities based on a NBR desired by the customer, a permanent NBR, and the maximum pool size.

The present invention also relates to a method of charging a flat-rate for a customer's use of a communication network and providing variable actual nominal bit rate ($NBR_r$) to suit for momentarily desired nominal bit rates requested by the customer.

In one embodiment, a method of generating an actual Nominal Bit Rate ($NBRr_r$) to determine a priority in a SIMA network for a customer which desires a $NBR_d$ to transmit a packet of information via the network, comprises: providing a flat-rate Nominal Bit Rate ($NBR_p$) for the customer, the $NBR_p$ being predefined between the customer and the network; providing a NBR pool having a maximum pool size ($S_{max}$), the $S_{max}$ being predefined between the customer and the network, the NBR pool being filled by a customer's $NBR_p$ and depleted by a customer's $NBR_d$; and generating the $NBR_r$ based on the $NBR_p$, the $S_{max}$, and the $NBR_d$.

Still in one embodiment of the present invention, the generating $NBR_r$ includes determining a size of the NBR pool, wherein when the NBR pool is empty, the $NBR_r$ is the $NBR_p$; when the size of the NBR pool is not smaller than the maximum pool size $S_{max}$, the $NBR_r$ is the $NBR_d$; when the size of the NBR pool is smaller than the maximum pool size $S_{max}$ but not empty, the $NBR_r$ is a sum of the $NBR_p$ and a NBR pool rate; the NBR pool rate being determined by the size of the NBR pool being divided by a time interval ($\Delta t$), the time interval being a time period for the network to change the actual Nominal Bit Rate.

Further in one embodiment of the present invention, the time interval is approximately one minute.

Yet in one embodiment of the present invention, the maximum pool size is approximately one giga bits.

The present invention also relates to a system of charging a flat-rate for a customer's use of a communication network and providing variable actual nominal bit rate ($NBR_r$) suitable for momentarily desired nominal bit rates requested by the customer.

In one embodiment, a system of generating an actual Nominal Bit Rate ($NBR_r$) 20 to determine a priority in a SIMA network for a customer which desires a $NBR_d$ to transmit a packet of information via the network, comprises: a customer management unit, the customer management unit providing a flat-rate Nominal Bit Rate ($NBR_p$) for the customer, the $NBR_p$ being predefined between the customer and the network, and providing a NBR pool having a maximum pool size ($S_{max}$), the $S_{max}$ being predefined between the customer and the network, the NBR pool being filled by a customer's $NBR_p$ and depleted by a customer's $NBR_d$; and a NBR pool unit for generating the $NBR_r$ based on the $NBR_p$, the $S_{max}$ and the $NBR_d$.

Still in one embodiment, the NBR pool unit determines a size of the NBR pool, wherein when the NBR pool is empty, the NBR pool unit generates the $NBR_r$ to be the $NBR_p$; when the size of the NBR pool is not smaller than the maximum pool size $S_{max}$, the NBR pool unit generates the $NBR_r$ to be the $NBR_d$; when the size of the NBR pool is smaller than the maximum pool size $S_{max}$ but not empty, the NBR pool unit generates the $NBR_r$ to be a sum of the $NBR_p$ and a NBR pool rate; the NBR pool rate being determined by the size of the NBR pool being divided by a time interval ($\Delta t$), the time interval being a time period for the network to change the actual Nominal Bit Rate.

In an alternative embodiment, instead of having a maximum pool size, the NBR pool is filled and/or emptied not proportional to $NBR_p$, $NBR_d$, but progressively as a function of $NBR_p$, $NBR_d$. In one embodiment, the NBR pool is filled either by not using the $NBR_p$ or by using a $NBR_r$ lower than the $NBR_p$. The reserved NBR pool, upon a certain time period, can be used to serve a corresponding much higher $NBR_r$ under a certain period of time. The longer the NBR pool is filled or not used, the higher the $NBR_r$ can be used, and the longer the use of a higher $NBR_r$ can last. Accordingly, the desired $NBR_d$ is the $NBR_r$, and the time of using this $NBR_r$ is determined based on the fact that the NBR pool does not become negative.

Further in the alternative embodiment, a constant z is predefined by the network operator to determine how the NBR pool is progressively filled and/or emptied as a function of NBR. The constant z can be 0, 1, 1.5, 2, etc. When the constant z is zero, the NBR pool is filled and/or emptied proportional to $NBR_p$, $NBR_r$ used by the customer as discussed in the first embodiment. In another embodiment, the constant z is one. Furthermore, the constant z can be implemented in the pay rate charged to the customer.

Further in one embodiment, a size of the NBR pool is determined. The NBR pool is filled by using a first $NBR_r$ lower than the $NBR_p$ for a first period of time and is emptied by using a second $NBR_r$ higher than the $NBR_p$ for a second period of time. The second $NBR_r$ and the corresponding second period of time are determined by the first $NBR_r$ and the corresponding first period of time and the constant z.

One advantage of the alternative embodiment is that it allows the customer to be able to use temporarily much higher NBR than what they normally use. In particular, it allows the customer to pay a low rate for a normal use of a low NBR but temporarily using a much higher NBR.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention discloses a NBR pool that is used with SIMA network so that a customer of a network service provider is allowed to change his/her NBR without any actual time-dependent charging. The NBR pool method and apparatus of the present invention has both the simplicity of flat-rate charging and the flexibility of time-dependent scheme.

Accordingly, the present invention provides a new approach to manage the SIMA network charging scheme using customer' NBR. In particular, a NBR pool unit controls the actual NBR used for determining the SIMA priorities based on the NBR desired by the customer, the customer's flat rate (or called "permanent") NBR, and a maximum pool size.

| | |
|---|---|
| NBR | Nominal Bit Rate (bits/s) |
| $NBR_p$ | Permanent NBR bought by a customer (based on the flat-rate paid) (bits/s) |
| $NBR_d$ | Desired NBR by the customer (during the use of the network) (bits/s) |
| $NBR_r$ | Actual NBR used during the period (bits/s) |
| $S_{max}$ | Maximum size of a NBR pool (bits) |
| CE (Figure 1) | Customer Equipment |
| A (Figure 1) | SIMA network access node |
| C (Figure 1) | SIMA network core node |
| ATM | Asynchronous Transfer Mode |
| SIMA | Simple Integrated Media Access |
| PL: | Priority Level |
| Δt | A time interval between the network changing the actual Nominal Bit Rate ($NBR_r$) (second) |
| Period | A period of time during which the NBR used by the customer ($NBR_r$) (second) |
| S(0) | Pool filling level at the beginning of a period (bits) |
| S(t) | Pool filling level at the end of period (bits) |
| t | Duration of the period (seconds) |
| z | Constant (e.g. 0, 1, 2, . . . etc.) |

Figure 1:
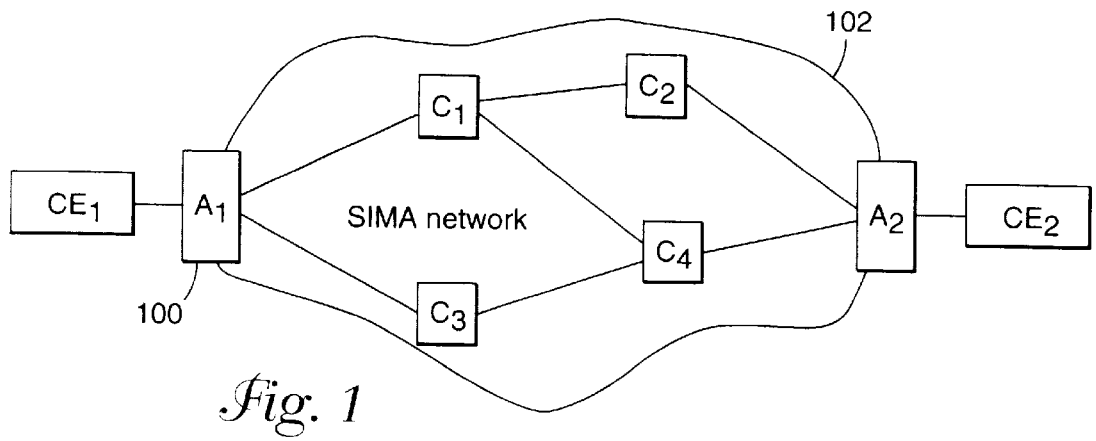
FIG. 1 illustrates SIMA network nodes used in communication from one customer to the other in a SIMA network in which a NBR pool unit of the present invention can be adapted.

In FIG. 1, a NBR pool unit or system 100 in accordance with the present invention is adapted to a SIMA (Simple Integrated Media Access) network 102. It is appreciated that the NBR pool unit 100 can also be adapted to or equipped with other networks, such as a conventional Internet Media Access network, etc.

Generally, when a customer or customer equipment (CE1) sends data packets or cells of information to another customer or customer equipment (CE2), customer CE1 accesses the network at node A1 (network access node). There are several routes, for examples, A1C1C2, A1C1C4, A1C3C4, to reach another network access node A2 accessible to customer or customer equipment CE2. C1, C2, C3, C4 are network core nodes. Accordingly, packets (frames or cells) of information are transmitted from one customer to the other customer via the network access nodes and network core nodes.

Figure 2:
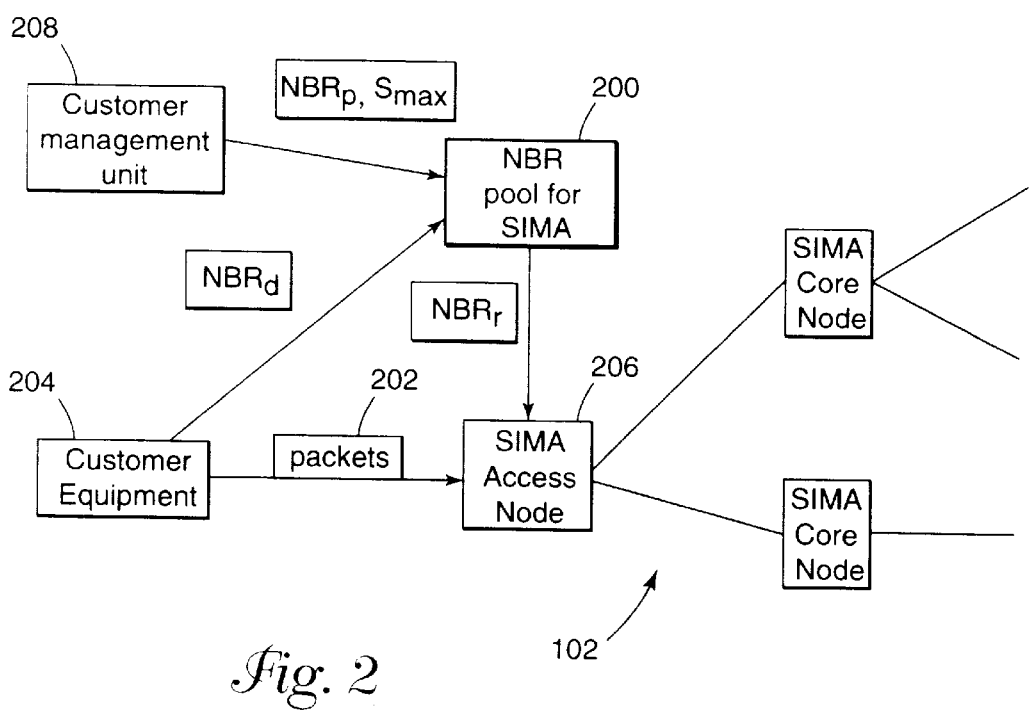
FIG. 2 is a block diagram of one embodiment of a NBR pool adapted for a SIMA network according to the present invention.

FIG. 2 illustrates a block diagram of a NBR pool unit 200 for the SIMA network 102 according to the present invention. Packets of information 202 are transmitted from a customer equipment 204 to a SIMA access node 206. An actual NBR, $NBR_r$, for determining priority level of the packets 202 at the SIMA access node 206, is provided by the NBR pool unit 200. The NBR pool unit 200 is coupled to the customer management unit 208 which provides the pool unit 200 with a permanent or flat-rate NBR, $NBR_p$, and the maximum size of the pool $S_{max}$. The permanent NBR and the maximum pool size can be selected by the customer based on the fee paid to the network service provider. The NBR pool unit 200 is also coupled to the customer equipment 204 which provides the NBR pool unit 200 with the momentary NBR desired by the customer, $NBR_d$. Based on the values of $NBR_p$, $S_{max}$, and $NBR_d$, the NBR pool unit 200 determines the actual NBR value, $NBR_r$.

The NBR pool unit 200 has a changeable pool size (bit) which does not exceed the maximum size of pool: $S_{max}$ (bit). When the NBR pool service is started, the pool size is full, that is:

$$S(t=0)=S_{max}$$

The network may change the actual bit rate $NBR_r$, at intervals of Δt. In determining the actual bit rate $NBR_r$, the NBR pool unit 200 operates a following method for the next interval:

$$S(t+\Delta t) = S(t) - \Delta t \cdot NBR_d + \Delta t \cdot NBR_p$$
If $S(t+\Delta t) >= S_{max}$
   then
      $NBR_r = NBR_d$
      $S(t+\Delta t) = S_{max}$
   else if $S(t+\Delta t) >= 0$
   then
      $NBR_r = NBR_d$
   else
      $NBR_r = NBR_p + S(t)/\Delta t$
      $S(t+\Delta t) = 0$ Accordingly, the NBR pool is filled by rate $NBR_p$ and depleted by rate $NBR_d$ as long as there is something in the pool to be used for a desired NBR. For example, if the pool is empty, the permanent $NBR_p$ is used for the desired $NBR_r$. If the pool has not yet reserved enough for he desired $NBR_d$ for the entire period Δt, the pool unit provides an actual NBR as being a NBR such that the pool is empty exactly at the end of the period Δt. In other words, the actual NBR can be the $NBR_p$ with additional bit rate determined by the formerly available pool size S(t) and the interval 66 t. Thereafter, the pool is empty.

The time constant 66 t may be short enough for practical uses—the main issue is that most customers are satisfied. On the other hand, the time constant Δt is long enough in order to avoid very short and strong peaks of high priority traffic sent to the network, which could deteriorate the predictability SIMA network services. In one embodiment, the time constant Δt is approximately 1 minute. It is appreciated that other suitable values, such as 1.5 minutes, 10 seconds, etc., can be used without departure from the principles of the present invention.

As mentioned above, the maximum pool size, $S_{max}$, of the pool also has an effect on the charging scheme, for example, the monthly fee, as a very large pool for all customers makes the network dimensioning more difficult which costs more. A relatively smaller sized pool can be used for a standard service. In one embodiment, the maximum pool size, $S_{max}$, is approximately 1 giga bits. It is appreciated that other suitable values can be used, such as 500 mega bits, 10 giga bits, etc., can be used without departure from the principles of the present invention. In practice, the actual determination of the parameters, Δt and $S_{max}$, can be predetermined or predefined by the network operator.

In NBR pool operation according to the present invention, the customer management unit 208 provides a customer's permanent or flat-rate $NBC_p$, a maximum pool size. Based on the $NBR_p$, $S_{max}$, and the customer's momentarily desired $NBR_d$, the NBR pool unit 200 generates an actual NBR for determining the priority level of the packets of information to be transmitted from the customer equipment 204 to SIMA access node 206.

Accordingly, the present invention allows the customer's NBR to be changed without any actual time-dependent charging. One of the advantages of a network system equipped with the NBR pool unit 200 is that a pure flat-rate charging is possible even though the customer is allowed to change the NBR.

Figure 3:
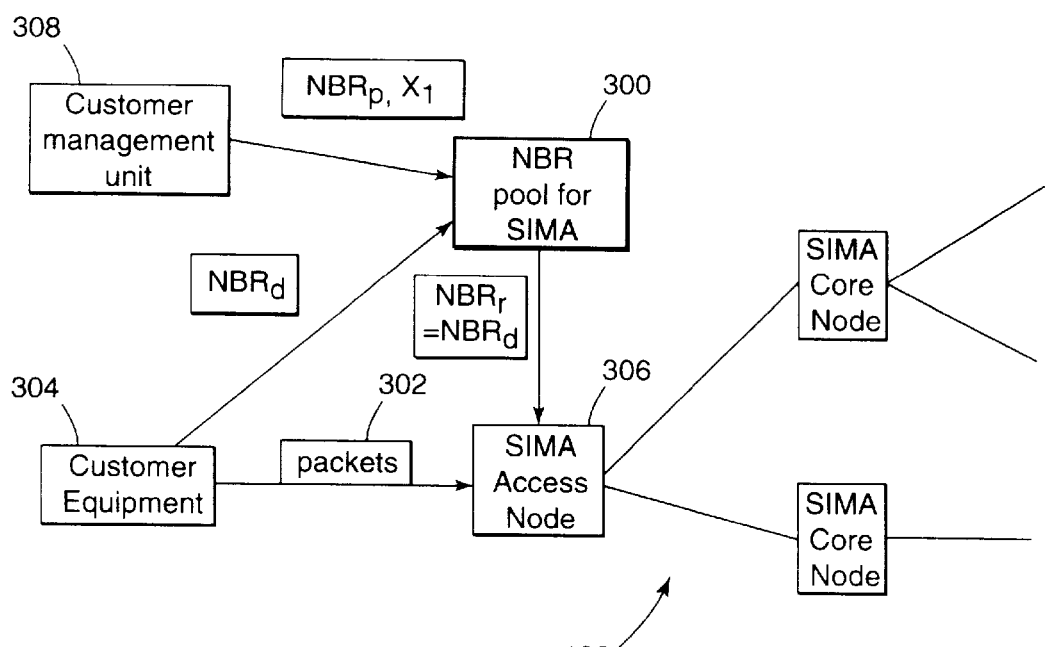
FIG. 3 is a block diagram of an alternative embodiment of a NBR pool adapted for a SIMA network according to the present invention.

In FIG. 3, an alternative embodiment of a NBR pool 300 adapted for a SIMA network is shown. Packets of information 302 are transmitted from a customer equipment 304 to a SIMA access node 306. An actual NBR, $NBR_r$, for determining priority level of the packets 302 at the SIMA access node 306, is provided by the NBR pool unit 300. The NBR pool unit 300 is coupled to the customer management unit 308 which provides the pool unit 300 with a permanent or flat-rate NBR, $NBR_p$, and the network constant z. The $NBR_p$ can be selected by the customer based on the fee paid to the network service provider. The constant z can be provided by the network service provider, e.g. z is 0, 1, 1.5, 2, or other suitable constant within the principles of the invention. The constant z can also be selected by a customer based on a fee paid to the network service provider. The NBR pool unit 300 is also coupled to the customer equipment 304 which provides the NBR pool unit 300 with the momentarily much higher NBR desired by the customer. Based on the values of $NBR_p$, z, and $NBR_r$, the NBR pool unit 300 provides the desired much higher NBR, $NBR_r$.

predefined by the network operator or predefined between the network operator and the customer.

If it is supposed that $NBR_p$ is, for instance, 100 kbit/s, the customer can use the pool as presented in the following Table 1. In each case the NBR pool is empty at the beginning. Then, the customer is filling the NBR pool by setting NBR=0 for a period t(1). During the next period from t(1) to t(2), the customer is draining the NBR pool in a way that it will be empty just at the end of the period.

As shown in the Table, the NBR that can be used during the second period depends strongly on the constant z.

TABLE 1

| Case | S(0) | NBR(1) kbit/s | t(1) hour | S(1) Mbit | t2–t1 min | z = 0 | NBR(2) z = 1 | kbit/s z = 2 | (S2) |
|---|---|---|---|---|---|---|---|---|---|
| 1 | 0 | 0 | 1/60 | 6 | 1 | 200 | 141 | 126 | 0 |
| 2 | 0 | 0 | 1 | 360 | 1 | 6100 | 781 | 394 | 0 |
| 3 | 0 | 0 | 1 | 360 | 10 | 700 | 265 | 191 | 0 |
| 4 | 0 | 0 | 1 | 360 | 120 | 150 | 124 | 114 | 0 |
| 5 | 0 | 0 | 24 | 8640 | 1 | 144100 | 3796 | 1129 | 0 |
| 6 | 0 | 0 | 24 | 8640 | 10 | 14500 | 1204 | 525 | 0 |
| 7 | 0 | 0 | 24 | 8640 | 120 | 1300 | 360 | 235 | 0 |
| 8 | 0 | 0 | 14*24 | 120960 | 1 | 2016100 | 14198 | 2721 | 0 |
| 9 | 0 | 0 | 14*24 | 120960 | 10 | 201700 | 4491 | 1263 | 0 |
| 10 | 0 | 0 | 14*24 | 120960 | 120 | 16900 | 1300 | 553 | 0 |

In the alternative embodiment, the NBR pool can be filled either by not using the $NBR_p$ or by using a $NBR_r$ lower than the $NBR_p$. The reserved NBR pool after a certain time period can be used to serve a corresponding much higher $NBR_r$ for a certain period of time. The longer the NBR pool is filled or not used, the higher the $NBR_r$ can be used, and the longer the use of a higher $NBR_r$ can last. Accordingly, the $NBR_r$ serves the desired NBR for a period of time, and the time of serving this desired NBR is determined based on the fact that the NBR pool does not become negative.

Formulae for the network to determine a pool filling level at the end of the period is as follows:

$$S(t) = S(0) + t \cdot \left( NBR_p - \left( \frac{NBR_r}{NBR_p} \right)^z NBR_r \right)$$

In addition, one criteria on which the network operates is that the network does not allow the filling level of the pool to become negative. Therefore:

$NBR_r$ can be at most: $NBR_p \cdot \left( \frac{S(0)}{t \cdot NBR_p} + 1 \right)^{1/(1+z)}$ As shown in the formula, if z=0, the first embodiment of the present invention as discussed above is obtained, i.e.

$$S(t) = S(0) + t \cdot \left( NBR_p - \left( \frac{NBR_r}{NBR_p} \right)^z NBR_r \right)$$

If z approaches infinity, a conventional system without a NBR pool is obtained. The constant z can be any suitable number, such as 0, 1, 1.5, 2, etc. In one preferred embodiment, the constant z is set to be 1. It is appreciated that the network operator can set and/or reset the constant z without departure from the principles of the present invention. It is also appreciated that the constant z can be For instance, in case 6 using the above formula, the customer fills a NBR pool by keeping NBR zero for 24 hours such that at the end of the 24 hours, the occupancy level of the NBR pool is 8.64 Gbit:

The NBR pool is filled in the first 24 hrs, and the pool level S is:

$S(24hrs)=0+24*3600(s)*(100-(0/100^0*0)=8640*10(Kbit/s)$ or $8640(Mbit/s)$ or $8.64(Gbit/s)$.

The NBR pool can then be drained depending on what the customer's desire is. If the customer needs 10 minutes in the second period and the constant z is 0, then the $NBR_r$ at most in the second period can be:

$$NBR_r = NBR_p \cdot \left( \frac{S(0)}{t \cdot NBR_p} + 1 \right)^{1/(1+z)} = 100 * (8640 * 10^3 (\text{kbit/s}) /$$

$$(10*60*100) + 1)^1$$

$$= 14500 \, (\text{kbit/s}).$$

Similarly, if the constant z is 1, the $NBR_r$ at most can be 1204 (kbit/s) for 10 minutes; if the constant z is 2, the $NBR_r$ at most can be 525 (kbit/s) for 10 minutes.

Therefore, if z is 0, the customer can have as high NBR as 14.5 Mbit/s for a period of 10 minutes before the pool is empty, whereas with z=1, the corresponding NBR that the customer can have is only about 1.2 Mbit/s. From the operator's viewpoint, the first period NBR value could bring about serious difficulties as regards the network dimensioning while the latter one could be quite harmless. Note that in case when z=1, the average NBR over the periods t1 and t2 is only 8.3 kbit/s ((0*24*3600+1204*10*60)/(24*3600+10*60)=8.3 kbit/s), whereas in case when z=0, the average NBR is 100 kbit/s ((0*24*3600+14500*10*60)/(24*3600+10*60)=100 kbit/s).

Further, if the $NBR_r$ of 300 kbit/s is desired by the customer for a video phone call of 10 minutes. Then, in case of z=0, the customer needs to keep NBR zero only for 20 minutes to make the call possible. The corresponding periods for cases z=1 and z=2 are 80 min. and 260 min., respectively.

Finally, if the paid permanent $NBR_p$ is 100 kbit/s and the customer is using permanently only 50 kbit/s, the customer can have a $NBR_r$ of 500 kbit/s every day for 45 minutes (assume the constant z is 1. The calculation is as follows:

$S(24\text{hrs})=0+24*3600(s)*(100-(50/100)^1*50)=75*24*3600(\text{Kbit}/s)$ $NBR_r = NBR_p \cdot \left( \frac{S(0)}{t \cdot NBR_p} + 1 \right)^{1/(1+z)}$ $500 = 100 * ((75 * 24 * 3600(\text{kbit}/s)/(t * 100) + 1))^{1/2}$ $t = 2700 \text{ (s)} = 45 \text{ min.}$ Further, similar to the first embodiment, the $NBR_r$ remains constant over a period that could be of the order of 1 minute.

Accordingly, in this alternative embodiment, the emptying rate of the NBR pool is not directly the difference between $NBR_p$ and $NBR_r$ as in the first preferred embodiment, but it depends on the $NBR_p$ to $NBR_r$ ratio. In this way, it is not necessary to limit a pool size ($S_{max}$), although the customer is given an option to decide whether s/he would want to limit a pool size, i.e., either using a scheme having a maximum pool size or using a scheme without having a maximum pool size. Alternatively, the two schemes can be combined in a suitable manner which gives the customer an option to choose one of the schemes without departure from the scope of the present invention.

The main advantage of the alternative embodiment as described above is that it takes automatically into account the fact that the contingent high bit rate peaks make the network dimensioning very difficult. In this scheme, the customer can momentarily have quite high $NBR_r$ but at the expense of having a much lower average $NBR_r$. On the other hand, the main advantage of the first embodiment as described above is that it provides the customer a higher average $NBR_r$ at the expense of not having as high $NBR_r$ as the customer desires.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of generating an actual Nominal Bit Rate ($NBR_r$) to determine a priority in a SIMA network for a customer which desires a desired Nominal Bit Rate ($NBR_d$) to transmit a packet of information via the network, the method comprising:
   providing a flat-rate Nominal Bit Rate ($NBR_p$) for the customer, the $NBR_p$ being predefined between the customer and the network;
   providing a NBR pool having a maximum pool size ($S_{max}$), the $S_{max}$ being predefined between the customer and the network, the NBR pool being filled by a customer's $NBR_p$ and depleted by a customer's $NBR_d$; and
   generating the $NBR_r$ based on the $NBR_p$, the $S_{max}$, and the $NBR_d$.

2. The method of claim 1, wherein the generating of the $NBR_r$ includes determining a size of the NBR pool, wherein when the NBR pool is empty, the $NBR_r$ is the $NBR_p$; when the size of the NBR pool is not smaller than the maximum pool size $S_{max}$, the $NBR_r$ is the $NBR_d$; when the size of the NBR pool is smaller than the maximum pool size $S_{max}$ but not empty, the $NBR_r$ is a sum of the $NBR_p$ and a NBR pool rate; the NBR pool rate being determined by the size of the NBR pool being divided by a time interval ($\Delta t$), the time interval being a time period for the network to change the actual Nominal Bit Rate.

3. A method of charging a flat-rate for a customer's use of a SIMA network and providing variable actual nominal bit rate ($NBR_r$) suitable for momentarily desired nominal bit rates requested by the customer, the method comprising:
   providing a Nominal Bit Rate (NBR) pool having a maximum pool size ($S_{max}$), the $S_{max}$ being predefined between the customer and the network, the NBR pool being filled by a customer's flat-rate Nominal Bit Rate ($NBR_p$) and depleted by a customer's desired Nominal Bit Rate ($NBR_d$); and
   determining a size of the NBR pool, wherein when the NBR 1 pool is empty, the $NBR_r$ is the $NBR_p$; when the size of the NBR pool is not smaller than the maximum pool size $S_{max}$, the $NBR_r$ is the $NBR_d$; when the size of the NBR pool is smaller than the maximum pool size $S_{max}$ but not empty, the $NBR_r$ is a sum of the $NBR_p$ and a NBR pool rate; the NBR pool rate being determined by the size of the NBR pool being divided by a time interval ($\Delta t$), the time interval being a time period for the network to change the actual Nominal Bit Rate.

4. The method of claim 3, wherein the SIMA network provides a Nominal Bit Rate (NBR) pool having a constant z, the constant z being predefined between the customer and the network, the NBR pool being filled progressively as a function of customer's flat-rate Nominal Bit Rate ($NBR_p$), a customer's desired Nominal Bit Rate ($NBR_d$), and the constant z.

5. The method of claim 3, wherein the SIMA network provides a Nominal Bit Rate (NBR) pool having a constant z, the constant z being predefined between the customer and the network, the NBR pool being emptied progressively as a function of a customer's flat-rate Nominal Bit Rate ($NBR_p$), a customer's desired Nominal Bit Rate ($NBR_d$), and the constant z.

6. The method of claim 4, wherein the SIMA network provides a Nominal Bit Rate (NBR) pool having a constant z, the constant z being predefined between the customer and the network, the NBR pool being emptied progressively as a function of a customer's flat-rate Nominal Bit Rate ($NBR_p$), a customer's desired Nominal Bit Rate ($NBR_d$), and the constant z.

7. The method of claim 6, further comprising determining a size of the NBR pool, filling the NBR pool by using a first $NBR_r$ lower than the $NBR_p$ for a first period of time, and emptying the NBR pool by using a second $NBR_r$ higher than the $NBR_p$ for a second period of time, the second $NBR_r$ and the corresponding second period of time being determined by the first $NBR_r$ and the corresponding first period of time and the constant z.

8. The method of claim 7, wherein the constant z is one.

9. The method of claim 7, wherein the constant z is zero.

10. A system of generating an actual Nominal Bit Rate ($NBR_r$) to determine a priority in a SIMA network for a customer which desires a desired Nominal Bit Rate ($NBR_d$) to transmit a packet of information via the network, the system comprising:
   a customer management unit, the customer management unit providing a flat-rate Nominal Bit Rate ($NBR_p$) for the customer, the $NBR_p$ being predefined between the customer and the network, and providing a NBR pool having a maximum pool size ($S_{max}$), the $S_{max}$ being predefined between the customer and the network, the NBR pool being filled by the customer's $NBR_p$ and depleted by the customer's $NBR_d$; and a NBR pool unit for generating the $NBR_r$ based on the $NBR_p$, the $S_{max}$, and the $NBR_d$.

11. The system of claim 10, wherein the NBR pool unit determines a size of the NBR pool, wherein when the NBR pool is empty, the NBR pool unit generates the $NBR_r$ to be the $NBR_p$; when the size of the NBR pool is not smaller than the maximum pool size $S_{max}$, the NBR pool unit generates the $NBR_r$ to be the $NBR_d$; when the size of the NBR pool is smaller than the maximum pool size $S_{max}$ but not empty, the NBR pool unit generates the $NBR_r$ to be a sum of the $NBR_p$ and a NBR pool rate; the NBR pool rate being determined by the size of the NBR pool being divided by a time interval ($\Delta t$), the time interval being a time period between the network changing the actual Nominal Bit Rate.

12. A system of charging a flat-rate for a customer's use of a SIMA network and providing variable actual nominal bit rate ($NBR_r$) suitable for momentarily desired nominal bit rates requested by the customer, the system comprising:

a SIMA network for providing a Nominal Bit Rate (NBR) pool having a maximum pool size ($S_{max}$), the $S_{max}$ being predefined between the customer and the network, the NBR pool being filled by a customer's flat-rate Nominal Bit Rate ($NBR_p$) and depleted by a customer's desired Nominal Bit Rate ($NBR_d$); and an NBR pool unit for determining a size of the NBR pool, wherein when the NBR pool is empty, the $NBR_r$ is the $NBR_p$; when the size of the NBR pool is not smaller than the maximum pool size $S_{max}$, the $NBR_r$ is the $NBR_d$; when the size of the NBR pool is smaller than the maximum pool size $S_{max}$ but not empty the $NBR_r$ is a sum of the $NBR_p$ and a NBR pool rate; the NBR pool rate being determined by the size of the NBR pool being divided by a time interval ($\Delta t$), the time interval being a time period for the network to change the actual Nominal Bit Rate.

13. The system of claim 12, wherein the SIMA network provides a Nominal Bit Rate (NBR) pool having a constant z, the constant z being predefined between the customer and the network, the NBR pool being filled progressively as a function of a customer's flat-rate Nominal Bit Rate ($NBR_p$), a customer's desired Nominal Bit Rate ($NBR_d$), and the constant z.

14. The system of claim 12, wherein the SIMA network provides a Nominal Bit Rate (NBR) pool having a constant z, the constant z being predefined between the customer and the network, the NBR pool being emptied progressively as a function of a customer's flat-rate Nominal Bit Rate ($NBR_p$), a customer's desired Nominal Bit Rate ($NBR_d$), and the constant z.

15. The system of claim 13, wherein the SIMA network provides a Nominal Bit Rate (NBR) pool having a constant z, the constant z being predefined between the customer and the network, the NBR pool being emptied progressively as a function of a customer's flat-rate Nominal Bit Rate ($NBR_p$), a customer's desired Nominal Bit Rate ($NBR_d$), and the constant z.

16. The system of claim 15, further comprising a NBR pool unit for determining a size of the NBR pool, wherein the NBR pool is filled by using a first $NBR_r$ lower than the $NBR_p$ for a first period of time, and the NBR pool is emptied by using a second $NBR_r$ higher than the $NBR_p$ for a second period of time, the second $NBR_r$ and the corresponding second period of time being determined by the first $NBR_r$ and the corresponding first period of time and the constant z.

17. The system of claim 16, wherein the constant z is one.

18. The system of claim 16, wherein the constant z is zero.

19. An article of manufacture for a computer-based data processing system, the article of manufacture comprising a computer readable medium having instructions for causing a computer to perform a method comprising:

providing a flat-rate Nominal Bit Rate ($NBR_p$) for the customer, the $NBR_p$ being predefined between the customer and the network;

providing a NBR pool having a maximum pool size ($S_{max}$), the $S_{max}$ being predefined between the customer and the network, the NBR pool being filled by the $NBR_p$ and depleted by a customer's desired Nominal Bit Rate ($NBR_d$); and generating an actual Nominal Bit Rate ($NBR_r$) based on the $NBR_p$, the $S_{max}$, and the $NBR_d$.

20. The article of manufacture of claim 19, wherein the generating of the $NBR_r$ includes determining a size of the NBR pool, wherein when the NBR pool is empty, the $NBR_r$ is the $NBR_p$; when the size of the NBR pool is not smaller than the maximum pool size $S_{max}$, the $NBR_r$ is the $NBR_d$; when the size of the NBR pool is smaller than the maximum pool size $S_{max}$ but not empty, the $NBR_r$ is a sum of the $NBR_p$ and a NBR pool rate; the NBR pool rate being determined by the size of the NBR pool being divided by a time interval ($\Delta t$), the time interval being a time period for the network to change the actual Nominal Bit Rate.

21. An article of manufacture for a computer-based data processing system, the article of manufacture comprising a computer readable medium having instructions for causing a computer to perform a method comprising:

providing a flat-rate Nominal Bit Rate ($NBR_p$) for the customer, the $NBR_p$ being predefined between the customer and the network;

providing a NBR pool having a constant z, the z being predefined between the customer and the network, the NBR pool being filled/emptied progressively as a function of the $NBR_p$, a customer's desired Nominal Bit Rate ($NBR_d$), and the constant z;and generating the $NBR_d$ based on the $NBR_p$ and the z.

22. The article of manufacture of claim 21, further comprising determining a size of the NBR pool by a NBR pool unit, filling the NBR pool by using a first $NBR_r$ lower than the $NBR_p$ for a first period of time, and emptying the NBR pool by using a second $NBR_r$ higher than the $NBR_p$ for a second period of time, the second $NBR_r$ and the corresponding second period of time being determined by the first $NBR_r$ and the corresponding first period of time and the constant z.

* * * * *